July 22, 1958  A. G. DOHRER  2,843,968
STORING AND DISPENSING APPARATUS FOR CRICKETS
Filed May 31, 1955
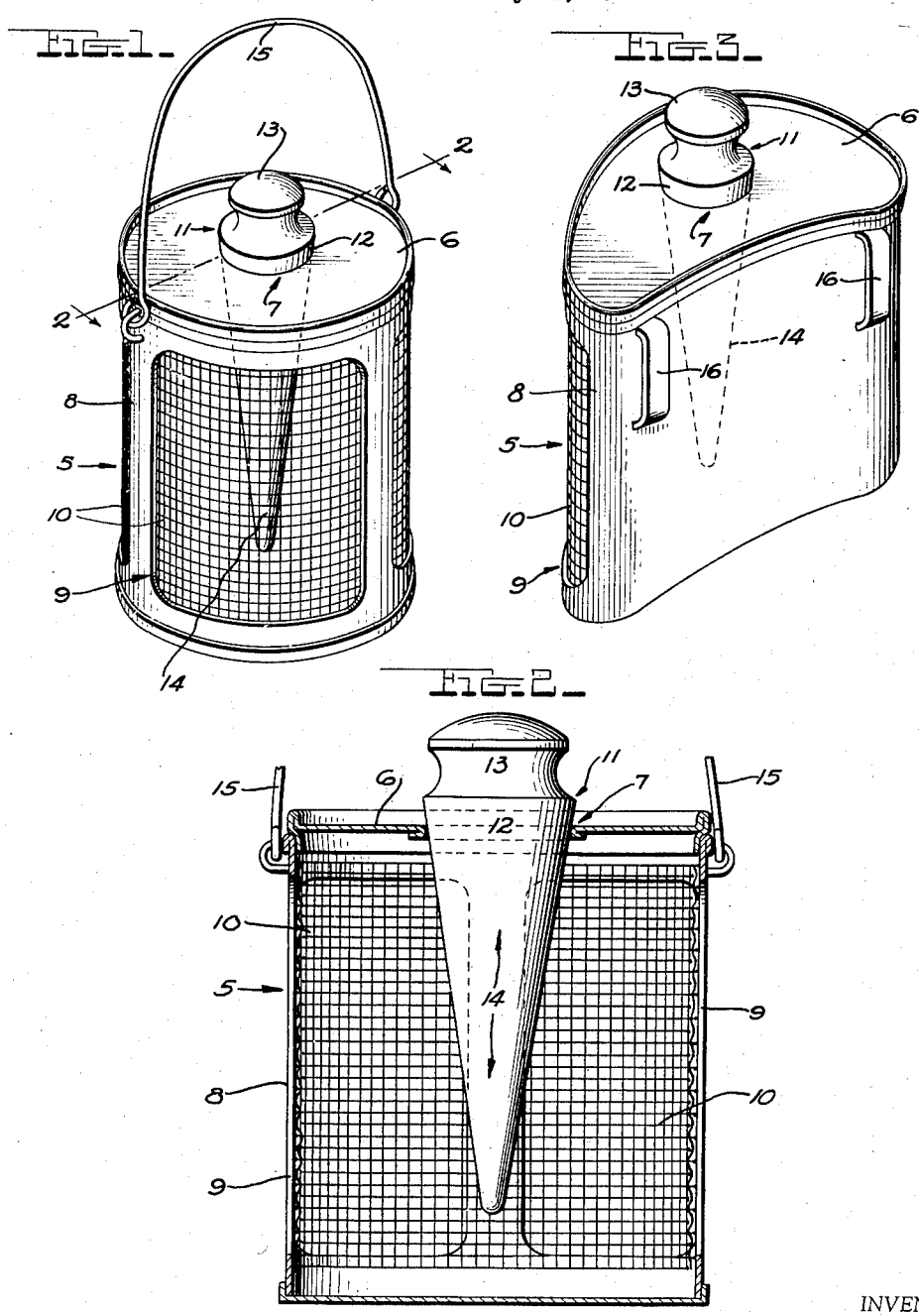
INVENTOR
Alfred G. Dohrer
BY Roy A. Plant
ATTORNEY

United States Patent Office 2,843,968
Patented July 22, 1958

2,843,968

STORING AND DISPENSING APPARATUS FOR CRICKETS

Alfred G. Dohrer, Ceresco, Mich.

Application May 31, 1955, Serial No. 511,918

6 Claims. (Cl. 43—55)

The present invention relates broadly to live bait containers, and in its more specific phases to a cage for storing and dispensing live crickets and grasshoppers.

Crickets are very potent bait for bass and various other kinds of fish but it has heretofore been difficult to remove them one at a time from any container in which they may be carried, and frequently while endeavoring to remove one, others will escape. About the only containers used for crickets are cans with nail holes for air and a press-on cover or a screen pail with a large cover. With this type of equipment the fisherman must open the container, with the danger of crickets escaping, and then catch a running cricket in a group of same. This frequently results in injuring a cricket, and a cricket with a leg off is of little use as bait since it does not move like a cricket which has jumped into the water. It was a recognition of these problems and difficulties, as well as the lack of any suitable equipment on the market for such use, which led to the conception and development of the present invention.

The present invention, accordingly, aims to provide a new and improved cricket carrier which will effectively overcome such prior difficulties and will enable the fisherman to easily remove a single cricket each time one is needed.

The container of the present invention is in the form of a cage having an opening (about one inch in diameter will suffice) through which the crickets are to be withdrawn one at a time. A closure, which may readily be removed with thumb and finger of one hand, is provided for the cricket-removal opening; and another object of the invention is to provide said closure with an elongated finger member extending into the cage and onto which a cricket may climb, whereby upon removal of the closure and concurrent gentle withdrawal of said elongated finger through the opening, a cricket thereon may be easily withdrawn and taken off for bait.

Another object of the invention is to provide both the aforesaid closure or cage and an elongated finger member in the form of a tapered plug which is normally inserted frictionally into the cricket-withdrawal opening, the outer end of said plug being provided with any suitable manipulating means, such as a finger knob, whereby it may be readily loosened, withdrawn and reinserted.

A further object is to provide a device or container for storing and dispensing live crickets with little danger of any escaping, and wherein same cannot be injured when in the container in normal quantity and removed one by one on the tapered plug portion of same.

A still further object is to provide a novel device which may be easily and inexpensively manufactured and profitably marketed at a reasonable price.

Still further objects and advantages of the invention will appear as the description proceeds.

To the accomplishment of the foregoing and related ends, the invention, then, consists of the live bait storing and dispensing means hereinafter fully described and particularly pointed out in the claims, the annexed drawing and the following description setting forth in detail certain means for carrying out the invention, such disclosed means illustrating, however, but several of various ways in which the principle of the invention may be used.

In the annexed drawing:

Figure 1 is a perspective view showing a preferred form of the invention having a carrying bail.

Figure 2 is an enlarged vertical sectional view taken on line 2—2 of Figure 1, looking in the direction of the arrows.

Figure 3 is a perspective view of a modified form of the invention having loops through which to thread the user's belt in order to utilize the latter as a support for conveniently positioning the device for use.

Preferences have been disclosed in the drawing and will be rather specifically described but attention is invited to the possibility of making variations as to the structure, size, and shape of the apparatus without departing from the spirit and obvious intent of the invention. Moreover, while a sheet metal and screen wire cage has been shown, plastic or other suitable material, as well as combinations of such material, could well be used.

In all views, the cage is denoted, in general, at 5, said cage having a removable cover 6 formed with a cricket withdrawal opening 7. The side wall 8 of the cage 5 is formed with large openings 9 covered with screen wire 10, giving adequate ventilation and also allowing the fisherman to readily see the crickets within the cage.

A vertically elongated, downwardly tapered plug 11, which is preferably of wood, is provided to close the opening 7 and to extend downwardly to a point sufficiently above the cage bottom to prevent crushing of any of the normal quantity of cage-contained crickets when inserting said plug. The upper end portion of the plug 11 forms a closure 12 for the opening 7 and, for ease of manipulation, may be provided with a knob 13; and the portion of said plug 11 extending downwardly from said closure 12, constitutes a reduced size finger 14 onto which the crickets may climb and be withdrawn through opening 7.

The cover 6 is readily removable to allow placing of a number of crickets and possibly some grass or the like in the cage 5. Prior to cover removal, the plug 11 is usually withdrawn from the opening 7, but this is not essential. When the cover is replaced and the plug 11 restored to its proper position, finger 14 extends close enough to the cage bottom to be readily accessible to the crickets, and invariably at least one cricket will crawl upwardly onto said finger 14 and remain there, while most of the others will climb onto the screen 10, or remain on the bottom of the cage.

Whenever a cricket is needed for bait, it is simply necessary for the fisherman to carefully withdraw the cricket carrying plug 11, watching in the meantime to avoid scraping the "captured" cricket from the finger 14 as it is pulled through the opening 7. As soon as the plug 11 has been withdrawn sufficiently to give access to this cricket with the fingers, it may be easily plucked off for bait. Soon after the plug is replaced, another cricket will climb onto the finger 14 and "await his turn," and so on until the supply has become exhausted.

In Figures 1 and 2, the cage 5 is cylindrical, of any desired size, and provided with a carrying bail 15. In Figure 3, however, a more or less kidney-shaped cage is shown, and this cage is provided with loops 16 through which the user may thread his belt to support the device in a convenient position for use.

From the foregoing, it will be seen that a novel and effective live cricket storing and dispensing device has been provided for attaining the desired ends within the scope and spirit of the invention. Attention is again invited, however to the possibility of using same for handling grasshoppers, and the making of variations in such device such as to its shape, size, construction, and materials.

Other modes of applying the principle of my invention may be employed instead of those explained, change being made as regards the apparatus herein disclosed, provided the means stated by any of the following claims or the equivalent of such stated means be employed.

I therefore particularly point out and distinctly claim as my invention:

1. In a live cricket storing and dispensing apparatus of the character described, wherein same has a cricket withdrawal opening in the upper portion of same, the combination therewith of a separately removable elongated tapered closure plug for said opening, said plug having a portion outside of said dispensing apparatus which is larger than said opening while the portion of said plug inside of said dispensing apparatus is smaller than said opening to facilitate withdrawal from same.

2. A live cricket storing and dispensing apparatus, which consists of a cage member with at least part of its surface area open and provided with screen covering means to admit air thereinto and also to permit observation of the interior of same, said cage member having a bottom member and a removable top member, said top member having a cricket withdrawal opening in same, and a separate outwardly removable cricket-removing closure member for said cricket withdrawal opening, said closure member being withdrawable while said top member remains in fixed position on said cage member.

3. A live cricket storing and dispensing apparatus as set forth in claim 2, wherein said closure member for said cricket withdrawal opening is in the form of a tapered wooden plug which fits and closes said opening and has its large size end outside of said cage while its tapered small size end extends to a point just short of contacting said bottom member to facilitate live crickets in said cage crawling onto said plug for removal, said tapered plug having a knob on its upper end to facilitate the manipulation of same.

4. A cage to contain live crickets, said cage having a removable cover with a cricket withdrawal opening through same, an outwardly removable closure means for said opening, the outer end of said closure means having a portion which is larger than said opening, and an elongated cricket-withdrawal finger carried by said closure means and extending into said cage, said finger having at least a portion small enough and long enough to freely carry a cricket when withdrawn through said opening.

5. A structure as specified in claim 4, in which the end of said closure means finger is close to but falls just short of reaching the side of said cage opposite to said removable cover when said closure means seals said opening, the outer end of said closure means being relatively short in comparison with said finger and said outer end being provided with a knob to facilitate the removal of same.

6. A cage to contain live crickets, said cage having a removable cover with a cricket-withdrawal opening through same, an outwardly removable closure means for said opening, the outer end of said closure means having a portion which is larger than said opening, and an elongated cricket-withdrawal finger carried by said closure means and extending into said cage in which a single tapered plug with the small end of same extending into said cage constitutes both said closure and said finger, the small end of said tapered plug being sufficiently small to facilitate carrying a cricket through said opening in the removable closure means, the outer end of said tapered plug being provided with means for use in removing same.

References Cited in the file of this patent

UNITED STATES PATENTS

| 851,443 | Schmidt | Apr. 23, 1907 |
| 928,033 | Drouilly | July 13, 1909 |
| 1,867,252 | Crigler | July 12, 1932 |
| 2,346,744 | Glassman | Apr. 18, 1944 |
| 2,535,856 | Luertzing | Dec. 31, 1950 |
| 2,587,899 | Rhodes | Mar. 4, 1952 |
| 2,756,912 | Armstrong | July 31, 1956 |

FOREIGN PATENTS

| 38,022 | Germany | Jan. 8, 1887 |

OTHER REFERENCES

"Wire Brings Live Bait to Hand," Popular Science, July 1948, p. 209.